US007690583B2

(12) United States Patent
Cherewatti et al.

(10) Patent No.: US 7,690,583 B2
(45) Date of Patent: Apr. 6, 2010

(54) HUMIDITY SENSOR AND FAN CONTROL DEVICE

(75) Inventors: Roger Cherewatti, Amherst, MA (US); Peter Byler, Longmeadow, MA (US)

(73) Assignee: Spring Loop Quail Limited Partnership, West Springfield, MA (US)

( * ) Notice: Subject to any disclaimer, the term of this patent is extended or adjusted under 35 U.S.C. 154(b) by 360 days.

(21) Appl. No.: 11/845,188

(22) Filed: Aug. 27, 2007

(65) Prior Publication Data
US 2009/0057430 A1    Mar. 5, 2009

(51) Int. Cl.
G05D 22/02    (2006.01)
(52) U.S. Cl. .................................. 236/44 A; 236/49.3
(58) Field of Classification Search .............. 236/44 A, 236/44 C, 49.3; 454/256; 165/54, 200; 62/180
See application file for complete search history.

(56) References Cited

U.S. PATENT DOCUMENTS

| 4,953,784 | A  | * | 9/1990 | Yasufuku et al. | ........... 236/44 A |
| 5,257,735 | A  | * | 11/1993 | Takahashi et al. | ......... 236/44 A |
| 6,145,750 | A  | * | 11/2000 | Carpenter | ................. 236/44 A |
| 6,230,980 | B1 | * | 5/2001 | Hudson | ..................... 236/44 A |
| 6,826,920 | B2 | * | 12/2004 | Wacker | ...................... 62/176.6 |
| 6,935,570 | B2 | * | 8/2005 | Acker, Jr. | ................... 236/44 R |
| 6,978,631 | B2 | * | 12/2005 | Fuller | .......................... 62/176.6 |
| 7,325,748 | B2 | * | 2/2008 | Acker, Jr. | ................... 236/44 A |
| 7,340,907 | B2 | * | 3/2008 | Vogh, III | ..................... 62/150 |
| 2005/0087612 | A1 | * | 4/2005 | Fuller | ........................ 236/44 A |
| 2005/0252983 | A1 | * | 11/2005 | Acker | ........................ 236/44 R |

OTHER PUBLICATIONS

Broan: "Humidity Sensing/Ultra Quiet Humidity Fan/Light/Night-Light Model HS120L". http://www.broan.com/display/router.asp?ProductID=650.

* cited by examiner

*Primary Examiner*—George Nguyen
(74) *Attorney, Agent, or Firm*—Cantor Colburn LLP

(57) ABSTRACT

A sensor in a bathroom continuously senses the humidity level therein at periodic intervals and provides the sensed humidity values to a processor, which stores the sensed values and continuously calculates an average humidity value over a time period. The processor continuously checks if the current sensed value exceeds an upper threshold value related to the calculated average humidity value and, if so, turns on an exhaust fan. Once the upper threshold value has been exceeded, the processor continuously checks if the current sensed value has dropped below a lower threshold value related to the calculated average humidity value and, if so, turns off the exhaust fan and, if not, leaves the exhaust fan on for a period of time. If the processor is not controlling the exhaust fan in the on position, a user can manually activate a switch to turn on the exhaust fan for a certain period of time.

19 Claims, 3 Drawing Sheets

HUMIDITY SENSOR AND FAN CONTROL DEVICE

BACKGROUND OF THE INVENTION

This invention relates in general to humidity sensing and control devices and in particular to a humidity sensor and fan control device which continuously senses the humidity level in a room and calculates an average humidity value in the room over time, where the device senses when the current humidity level in the room has reached or exceeded a first threshold value higher than the calculated average value and turns on an exhaust fan in the room to lower the humidity level therein, and where the device senses when the current humidity level in the room has reached or decreased below a second threshold value lower than the first threshold value and turns off the exhaust fan.

In a bathroom, it is known that the humidity can rise to uncomfortable levels, particularly when hot water is being used for a shower, bath or other reasons. The moisture can cause mold and mildew to form, which is a major concern. Bathrooms typically have an exhaust fan that helps to remove the moisture to the outside and make the bathroom less humid and more comfortable. However, the exhaust fan is generally turned on by a person using a manual switch, which causes the exhaust fan to be on longer than required for some times and shorter than required for other times. That is, there is generally little or no correlation between the humidity level in the room and the amount of time that the exhaust fan is operational.

Also known are wall-mounted exhaust fan control switches where a user can manually select a numerical humidity value at which the bathroom exhaust fan will turn on when the humidity level exceeds the selected value and will turn off when the humidity level drops below the selected value. Drawbacks with these switches include the fact that the humidity levels outdoors and thus also within rooms of a home change significantly throughout the year, more so in some parts of the country than others, and these switches have no means for automatically recognizing and compensating for these different humidity levels. Also, there are some environments (e.g., dressing rooms in health clubs, public restrooms in restaurants) where it is undesirable to have the humidity level switch setting constantly being changed by people in the room.

Further, it is known to have a bathroom ceiling exhaust fan with a built-in humidity sensor that detects increases in humidity in the bathroom brought about by use of the bath or shower and automatically turns on the exhaust fan. However, this type of device is problematic in that it shuts off the exhaust fan only after a certain period of time and not as a function of the humidity level in the room, which may not allow for adequate removal of undesirable moisture in the room. Also, this type of device does not provide for manual turn-on of the exhaust fan, particularly when the device is not automatically controlling operation of the exhaust fan. Further, such exhaust fans with built-in humidity sensors tend to be relatively expensive.

What is needed is a humidity sensor and fan control device that is relatively inexpensive and easy to install and operate, and which continuously senses the humidity level in a room and calculates an average humidity value in the room over time, that automatically determines when the current sensed humidity level in a room has increased to a certain value with respect to the calculated average value and turns on an exhaust fan in the room to lower the humidity level, that automatically determines when the current sensed humidity level in the room has decreased to a certain value with respect to the calculated average value and turns off the exhaust fan, that also provides for a manual turn-on of the exhaust fan when the device is not automatically controlling operation of the exhaust fan, and that by controlling the exhaust fan in this manner mold and mildew in the room is reduced or eliminated.

SUMMARY OF THE INVENTION

According to an aspect of the present invention, a humidity sensor mounted in the wall of a bathroom, senses the humidity level of the room at periodic intervals, for example, once per second and provides the sensed humidity values to a processor. The processor stores the sensed humidity values in a memory and continuously calculates and stores an average humidity value in the room over a period of time, for example, four hours. Once the average humidity value has been calculated for a full four hour time period, the processor continuously stores the most recent four hours of sensed humidity values from the sensor and calculates and stores the current average humidity value using the most recent four hours of sensed humidity values. The processor also continuously checks whether the current sensed humidity value from the sensor meets and/or exceeds a first, upper threshold value; for example, if the current sensed humidity value is equal to or greater than ten percent of the current calculated average humidity value. If so, then the device turns on the exhaust fan to remove moisture from the room. All the while the sensor continues to periodically sense the actual humidity level in the room and provide the sensed values to the processor which continues to store the sensed values and also calculates the average humidity value. Once the upper threshold value has been met or exceeded, the processor checks if the current sensed humidity value has met or dropped below a second, lower threshold value; for example, equal to or less than five percent of the current calculated average humidity value. If so, the device turns off the exhaust fan. In the alternative, once the upper threshold value has been met or exceeded and the exhaust fan is turned on and if the current sensed humidity value does not meet or go below the lower threshold value after a set amount of time, for example, thirty minutes, the device will turn off the exhaust fan.

According to another aspect of the present invention, if at any time the processor is not currently controlling the exhaust fan in the on position as described above, then a user can manually activate a switch to turn on the exhaust fan for a certain period of time; for example, fifteen minutes, and the user can repeatedly activate the exhaust fan for additional fifteen minute intervals as long as the processor is not currently controlling the exhaust fan in the on position. If the exhaust fan is being operated in this manual mode and if the processor at any time determines that the upper threshold humidity value has been met or exceeded by a current actual humidity value, the processor takes over control of the exhaust fan as described above.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
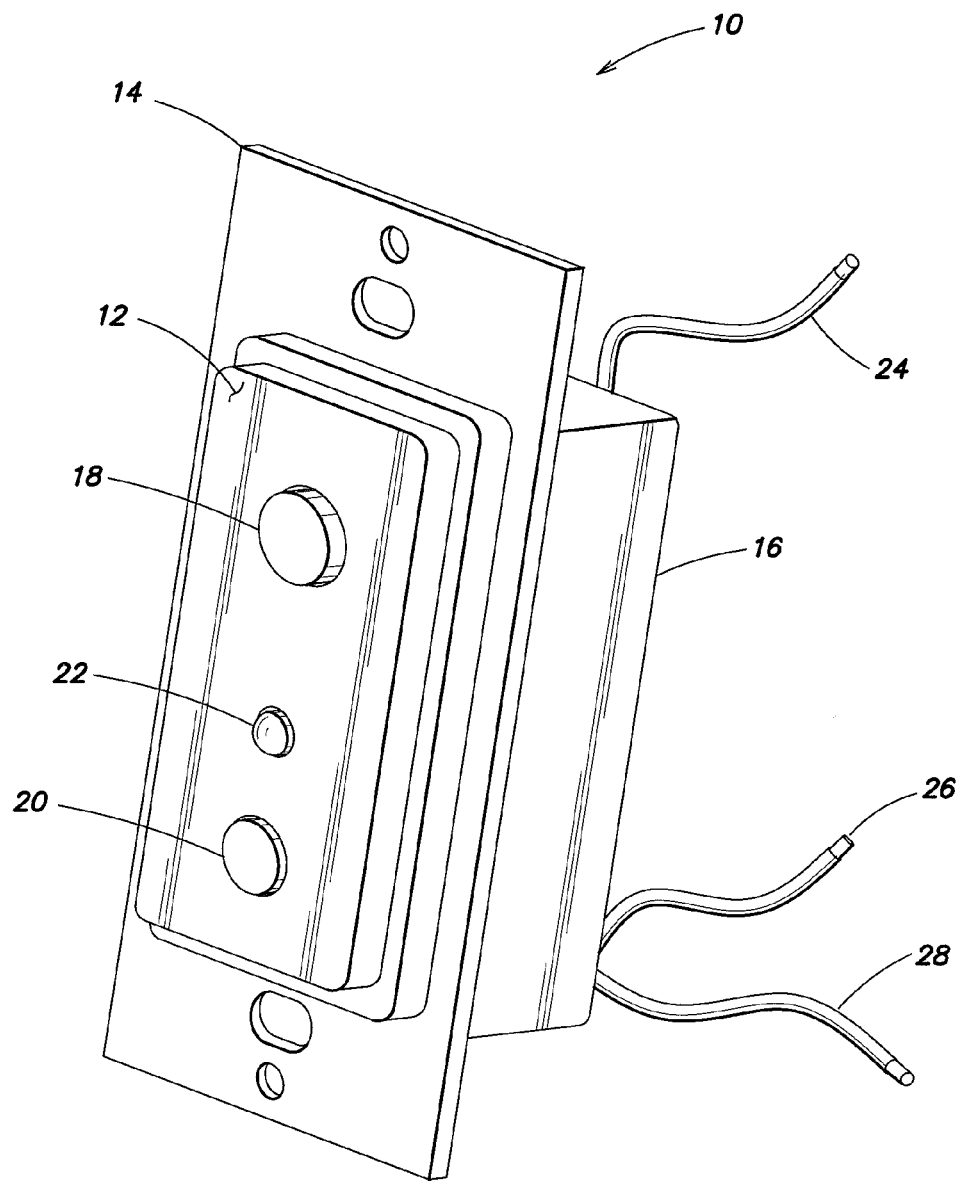
FIG. 1 is a perspective view of a humidity sensor and fan control device according to the present invention.

In the figures, like reference numerals refer to like elements. Referring to FIG. 1, there illustrated in perspective is a wall mounted humidity sensor and fan control device 10 according to an embodiment of the present invention. In a preferred embodiment, the device 10 is the size of a typical single-gang electrical box and mounts within the wall of a bathroom or other room of a home or other building which also contains an exhaust fan located in the ceiling or elsewhere in the room to remove undesirable moisture in the room air resulting, e.g., from hot water usage, such as in the nature of a bath or a shower. The device 10 includes a front panel 12, a mounting plate 14, and a rear enclosure or "black box" 16. On the front panel 12 is mounted a humidity sensor 18. Typically the sensing portion of the humidity sensor 18 protrudes out from the face of the front panel 12 so as to be able to sense the humidity levels in the room. Also mounted on the front panel 12 is a push button input switch 20 and a light emitting diode (LED) 22. The operation of the input switch 20 and the LED 22 will be described in detail hereinafter. The mounting plate 14 is used to mount the device 10 to the wall at the appropriate location within the room. The black box 16 may be a plastic enclosure that contains the electronics and electrical devices which implement the functionality of the device 10, as described in detail hereinafter. Protruding from the back of the black box 16 are three wires 24, 26, 28 that connect with the standard 120 VAC electrical power supply and also with the exhaust fan (FIG. 2).

Figure 2:
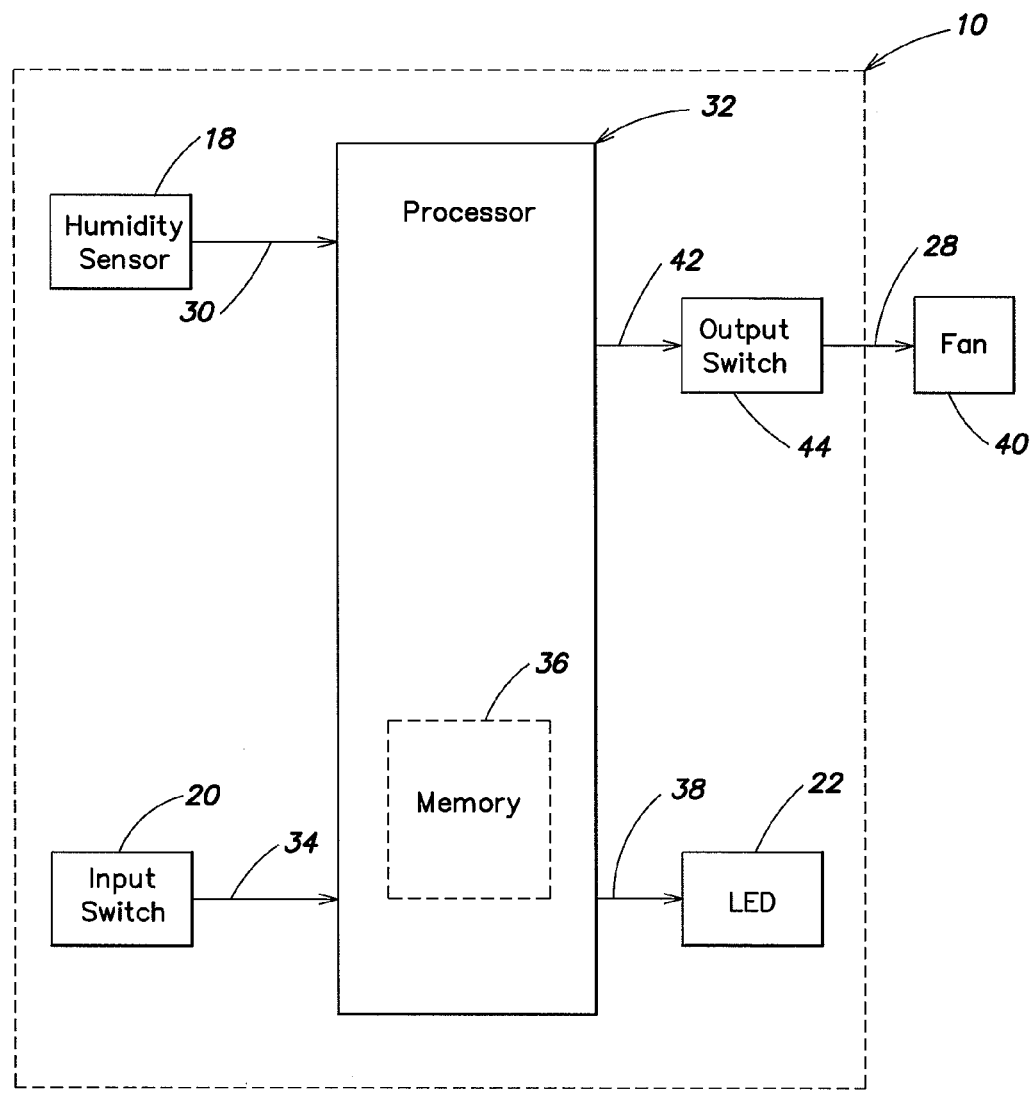
FIG. 2 is a block diagram of the humidity sensor and fan control device of FIG. 1 connected with an exhaust fan.

Referring to FIG. 2, there illustrated is a block diagram of the electronics and electrical components that comprise a preferred embodiment of the device 10 of the present invention. Although not illustrated, electrical power is provided to the various components in the required form (AC or DC) and at the appropriate values as derived in a known manner from the standard 120 VAC electrical power supply within the home or other building. The humidity sensor 18 is illustrated as being connected on a signal line 30 with a processor 32, which may comprise, for example, a known general purpose microprocessor, a dedicated programmable application specific integrated circuit (ASIC), or some other type of processing device. The humidity sensor 18 may include, if required, the appropriate known electronics that provide a signal on the line 30 to an input of the processor 32 in the proper form (e.g., voltage or frequency) and indicative of the current sensed humidity value in the room for storage and processing by the processor 32. Also connected to an input of the processor 32 on a signal line 34 is a signal indicative of the status (i.e., open or closed) of the input switch 20. The processor 32 may include a writable memory 36 (e.g., RAM) either integral with the processor 32 or separate therefrom. The memory 36 is of sufficient size to store a relatively large number of samples of the humidity values provided over time from the humidity sensor 18, as described in detail hereinafter with respect to the flowchart of FIG. 3. Connected to an output port of the processor 32 on a signal line 38 is the LED 22. The LED 22, which is optional, is turned on when the exhaust fan 40 in the room is operational. Alternatively, the LED can be any other type of indicator, either visual or audible, that indicates when the exhaust fan 40 is turned on or is operational. Connected to another output port of the processor 32 on a signal line 42 is an output switch 44, which is connected by one of the wires 28 to the exhaust fan 40. Alternatively, the output switch 44 may be omitted if it is possible to connect the corresponding output on the line 42 of the processor 32 directly to the exhaust fan 40 wherein the exhaust fan has its own internal switch that can be controlled by the output from the processor 32 on the line 42.

Figure 3:
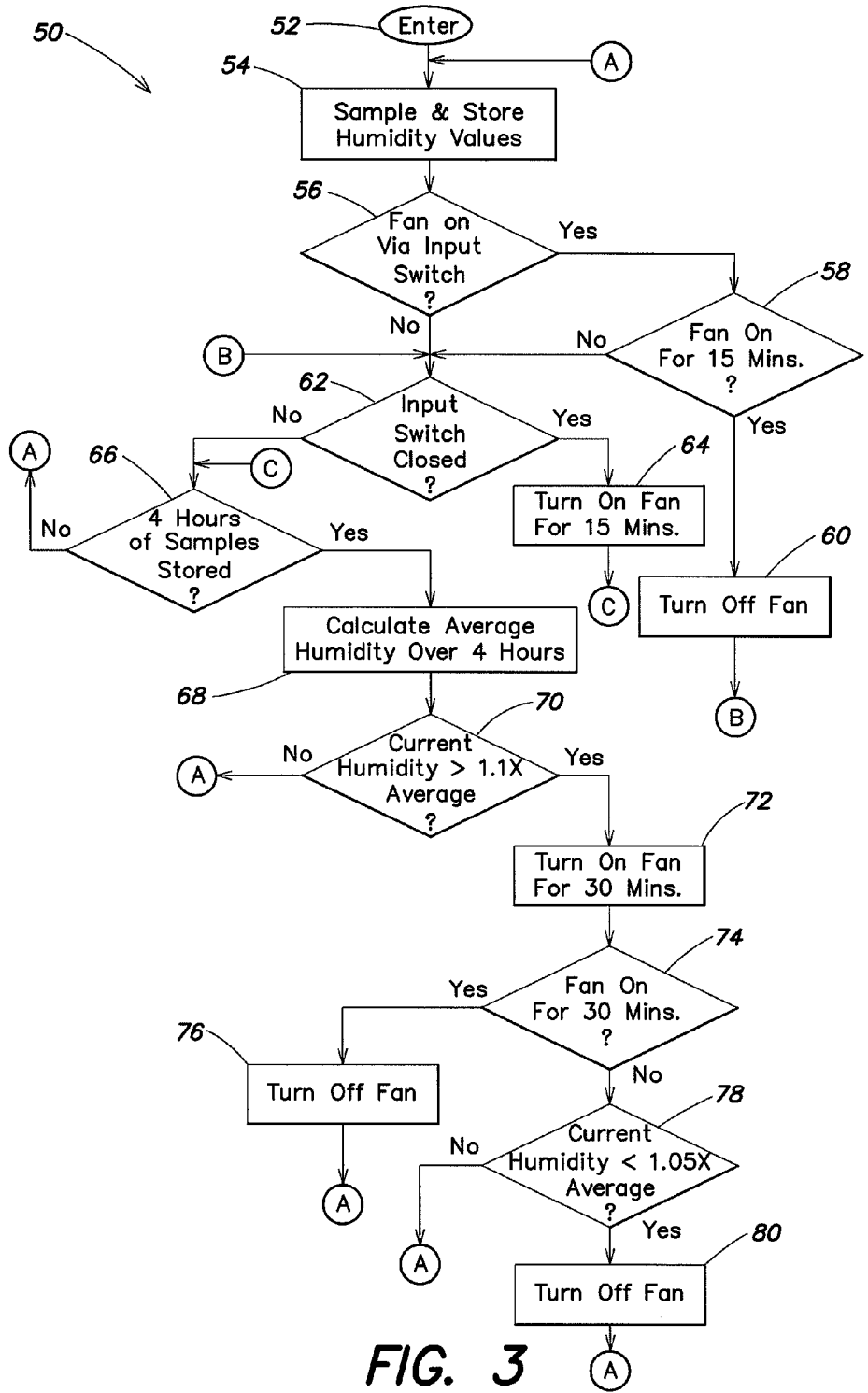
FIG. 3 is a flowchart of steps performed by a processor within the humidity sensor and fan control device of FIGS. 1-2.

Referring to FIG. 3, there illustrated is a flowchart of steps performed by the processor 32 of FIG. 2 in an example of a routine 50 that may be used to implement the functionality of the device 10 of the present invention. The steps of the routine 50 may be stored in a non-volatile portion of the memory 36 (e.g., ROM, PROM). After an enter step 52, a step 54 is executed where the current sensed humidity sample value is obtained by the processor 32 from the humidity sensor 18 on the line 30 and stored in the memory 36. Preferably, the routine 50 of FIG. 3 is executed by a processor 32 that operates fast enough to implement sampling of the sensed humidity values in the step 54 periodically once every second (i.e., at a frequency of 1 Hz). However, sampling at a frequency of 1 Hz is purely exemplary; other sampling frequencies may be utilized. If the processor 32 operates at a speed where the sample step 54 would occur at a frequency greater than 1 Hz, then appropriate delays can be built into the routine 50 such that the periodic sampling of the humidity values occur at the preferred frequency of 1 Hz.

Next, a comparison step 56 is executed that determines if the exhaust fan 40 was turned on manually as a result of a user activating the input switch 20 on the front panel 12 of the device 10. If so, a comparison step 58 is executed to determine if the exhaust fan 40 has been on for, e.g., fifteen minutes. A timer may be implemented in the processor 32 for keeping track of the amount of time that the exhaust fan 40 has been on. Also, whenever the exhaust fan 40 is on the LED 22 also lights up as an indication of the exhaust fan being on. The exhaust fan 40 being on for fifteen minutes is purely exemplary; other amounts of time may be utilized. Alternatively, a separate timer may be included within the device 10. If the exhaust fan 40 has been on for fifteen minutes as a result of the manual input switch 20, a step 60 is executed where the exhaust fan 40 is turned off, and the routine 50 branches to a comparison step 62 to determine if the input switch 20 is closed. If the exhaust fan 40 has not been on for fifteen minutes, then the comparison step 62 is executed. If the input switch 20 is closed, the exhaust fan 40 is turned on in a step 64 for another new fifteen minute period of time (i.e., the fifteen minute timer is restarted) and the routine 50 branches to a comparison step 66 to determine whether four continuous hours of humidity samples at 1 HZ have been stored in the memory 36 by the repeated operation of the step 54 by way of repeated performance of the routine 50. Four continuous hours of humidity samples are purely exemplary; other amounts of sample time may be utilized. Similarly, if the input switch 20 is determined to be open in the comparison step 62, the routine branches to the comparison step 66. The aforementioned steps 56-64 allow for manual operation of the exhaust fan 40 when the processor 32 is not "automatically" controlling the operation of the exhaust fan 40, as per the remaining steps in the routine 50 of FIG. 3 described hereinafter.

If the result of the comparison step 66 indicates that four hours of humidity samples have not yet been provided to the processor 32 by the humidity sensor 18 and stored in the memory 36, the routine 50 branches back to the sample and store step 54. Instead, if four hours of samples have been stored in the memory 36, a step 68 is executed where the processor 32 calculates the current average humidity value from the four hours worth of stored humidity samples, and the processor 32 also stores this calculated current average humidity value in the memory 36. A comparison step 70 is then executed where the processor 32 compares the current humidity sample value acquired in the step 54 with a first, upper threshold humidity value that is calculated by the processor 32 to be ten percent (10%) greater than (or 1.1 times) the current calculated average humidity value. A value of ten percent is purely exemplary; other threshold values related to the current calculated average humidity value may be utilized. If the current humidity sample value is a certain predetermined relationship to the upper threshold humidity value, for example, less than or equal to, the routine branches back to the sample and store step 54. If instead the current humidity sample value is greater than the upper threshold humidity value, then a step 72 is executed where the exhaust fan 40 is turned on for thirty minutes. Thirty minutes of exhaust fan turn-on time is purely exemplary; other amounts of time may be utilized. At this point in the routine 50, the processor 32 is "automatically" controlling operation of the exhaust fan 40 based on the relationship of the current sensed humidity value to an upper threshold value that is a function of the current calculated average humidity value. The distinction between the exhaust fan 40 being turned on in the step 64 by manual operation of the input switch 20 and the exhaust fan 40 being turned on in the step 72 by the current humidity sample value being greater than the upper threshold value may, for example, be carried out or indicated by one or more bits in a specific location in the memory 36 or in a register in the processor 32.

Next, a comparison step 74 is executed where the processor determines if the exhaust fan has been on for thirty minutes as a result of the step 72. That is, the exhaust fan 40 may be already on for some portion of the fifteen minute interval as a result of the step 64 when the comparison step 70 determines that the exhaust fan 40 should be turned on by the step 72 for an additional thirty minutes. If the exhaust fan 40 has been on for thirty minutes as a result of the step 72, the exhaust fan is turned off in a step 76 and the routine 50 branches back to the sample and store step 54. If instead the exhaust fan 40 has not been on for thirty minutes as a result of the step 72, a comparison step 78 is executed where the current humidity sample value acquired in the step 54 is compared with a second, lower threshold humidity value that is calculated by the processor 32 to be five percent (5%) greater than (or 1.05 times) the current calculated average humidity value. A value of five percent is purely exemplary; other threshold values related to the current calculated average humidity value may be utilized. If the current humidity sample value is in a certain predetermined relationship to this lower threshold humidity value, for example, greater than or equal to, the routine branches back to the sample and store step 54 and the exhaust fan 40 remains on. If instead the current humidity sample value is less than the lower threshold humidity value, a step 80 is executed where the exhaust fan 40 is turned off and the routine 50 branches back to the sample and store step 54.

If, as a result of the comparison step 78, the exhaust fan 40 remains on and the routine 50 branches back to the sample and store step 54, when the comparison step 56 is next executed the result of that step 56 will be a "NO". Then the comparison step 62 will cause the processor 32 to look at, for example, the location in memory 36 which indicates the distinction between the exhaust fan 40 being turned on in the step 64 by manual operation of the input switch 20 and the exhaust fan 40 being turned on in the step 72 by the current humidity sample value being greater than the upper threshold value. Because the exhaust fan 40 in this situation is turned on in the step 72 (i.e., "automatically" under control of the processor 32), the comparison step 62 is not executed to determine if the input switch 20 is closed. This is because, in a preferred embodiment, the input switch 20 is not allowed to override the control of the exhaust fan 40 by the processor 32 utilizing the sampled humidity values and the calculated humidity average value.

It should be understood that the flowchart of FIG. 3 is an example of a routine 50 that causes the humidity sensor and fan control device 10 of the present invention to operate to periodically sample the humidity levels in a room at particular time intervals over time, to periodically calculate an average humidity value, to periodically compare a current sampled humidity value to the current calculated average humidity value, and to turn on and off an exhaust fan accordingly, and to also allow for manual operation of the exhaust fan under certain circumstances. Other routines may be utilized to operate the device 10 as should be apparent to one of ordinary skill in the art in light of the teachings herein.

In addition, while the humidity sensor 18 has been described and illustrated herein in a preferred embodiment as being part of a "combined" device 10 together with the remaining components of the device, it is entirely possible for the humidity sensor 18 to be located separate from other components of the device 10. For example, the humidity sensor 18 may be located on or near the ceiling and then provide its sensed humidity signal to the processor which may be located farther down on the wall with the remaining components of the device 10.

Although the present invention has been illustrated and described with respect to several preferred embodiments thereof, various changes, omissions and additions to the form and detail thereof, may be made therein, without departing from the spirit and scope of the invention.

What is claimed is:

1. A device for controlling an exhaust fan, comprising:
   a sensor that periodically senses a humidity level in a room and provides a corresponding sensed periodic humidity signal having a corresponding periodic value indicative of the associated periodic sensed humidity levels;
   a processor that calculates an average humidity value over a period of time from the periodic sensed humidity signal values over the period of time and provides a current calculated average humidity value, where the processor compares a current periodic sensed humidity signal value to a first threshold humidity value that is a function of the current calculated average humidity value and if the current periodic sensed humidity signal value has a predetermined relationship to the first threshold humidity value the processor provides a signal to turn on the exhaust fan for a period of time, where if the exhaust fan is turned on as a result of the current periodic sensed humidity signal value having the predetermined relationship to the first threshold humidity value the processor compares the current periodic sensed humidity signal value to a second threshold humidity value that is a function of the current calculated average humidity value and if the current periodic sensed humidity signal value has a predetermined relationship to the second threshold humidity value the processor provides a signal to turn off the exhaust fan.

2. The device of claim 1, further comprising an input switch that provides a signal to the processor when it is desired to turn the exhaust fan on, where the processor turns on the exhaust fan in response to the input switch signal if the exhaust fan is off.

3. The device of claim 1, where the processor provides an indicator that indicates when the exhaust fan is turned on in response to the input signal and that indicates when the exhaust fan is turned on when the current periodic sensed humidity signal value has a predetermined relationship to the first threshold value.

4. The device of claim 1, where the first threshold value is greater than the current calculated average humidity value.

5. The device of claim 1, where the second threshold value is greater than the current calculated average humidity value and less than the first threshold value.

6. The device of claim 1, where the predetermined relationship of the current periodic sensed humidity signal value to the first threshold humidity value is the current periodic sensed humidity signal value being greater than the first threshold humidity value.

7. The device of claim 1, where the predetermined relationship of the current periodic sensed humidity signal value to the second threshold humidity value is the current sensed humidity signal being less than the second threshold humidity value.

8. The device of claim 1, where the room is a bathroom.

9. The device of claim 1, further comprising an indicator to indicate when the exhaust fan is turned on.

10. The device of claim 1, further comprising a memory, where the processor stores the periodic sensed humidity signal values in the memory.

11. The device of claim 2, further comprising a memory, where the processor stores in the memory an indicator that indicates when the exhaust fan is turned on in response to the input signal and that indicates when the exhaust fan is turned on when the current periodic sensed humidity signal value has a predetermined relationship to the first threshold value.

12. The device of claim 1, where the sensor and the processor are co-located together as part of or within an enclosure.

13. The device of claim 12, where a sensing portion of the sensor protrudes from a front panel of the enclosure.

14. A device for controlling an exhaust fan in a room, comprising:
   a sensor that senses a humidity level in the room at time intervals and provides a sensed humidity signal having a value indicative of the sensed humidity levels at each of the time intervals;
   a processor that calculates an average humidity value from the sensed humidity signal values over a period of time and provides a current calculated average humidity value, where the processor compares a sensed humidity signal value at a current time interval to a first threshold humidity value and if the sensed humidity signal value at the current time interval has a predetermined relationship to the first threshold humidity value the processor provides a signal to turn on the exhaust fan for a period of time, where if the exhaust fan is turned on as a result of the sensed humidity signal value at the current time interval having the predetermined relationship to the first threshold humidity value the processor compares the current sensed humidity signal value at the current time interval to a second threshold humidity value and if the sensed humidity signal value at the current time interval has a predetermined relationship to the second threshold humidity value the processor provides a signal to turn off the exhaust fan, where the second threshold humidity value is a function of the current calculated average humidity value.

15. The device of claim 14, further comprising an input switch that provides a signal to the processor when it is desired to turn the exhaust fan on, where the processor turns on the exhaust fan in response to the input switch signal if the exhaust fan is off.

16. The device of claim 14, where a first threshold humidity value is a function of the current calculated average humidity value.

17. The device of claim 14, where the first threshold value is greater than the current calculated average humidity value, and where the second threshold value is greater than the current calculated average humidity value and less than the first threshold value.

18. The device of claim 14, where the predetermined relationship of the sensed humidity signal value at the current time interval to the first threshold humidity value is the sensed humidity signal value at the current time interval being greater than the first threshold humidity value, and where the predetermined relationship of the sensed humidity signal value at the current time interval to the second threshold humidity value is the sensed humidity signal at the current time interval being less than the second threshold humidity value.

19. The device of claim 14, further comprising a memory, where the processor stores the sensed humidity signal values at each of the time intervals in the memory.

* * * * *